(12) United States Patent
Li et al.

(10) Patent No.: US 12,724,163 B2
(45) Date of Patent: Sep. 1, 2026

(54) METHOD AND APPARATUS FOR INVERTING FORMATION WAVE IMPEDANCE USING DAS BOREHOLE SEISMIC DATA

(71) Applicants: China National Petroleum Corporation, Beijing (CN); BGP Inc., China National Petroleum Corporation, Hebei (CN)

(72) Inventors: Yanpeng Li, Hebei (CN); Zhidong Cai, Hebei (CN); Fei Li, Hebei (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 244 days.

(21) Appl. No.: 18/688,121

(22) PCT Filed: Jun. 29, 2022

(86) PCT No.: PCT/CN2022/102511
§ 371 (c)(1),
(2) Date: Feb. 29, 2024

(87) PCT Pub. No.: WO2023/123952
PCT Pub. Date: Jul. 6, 2023

(65) Prior Publication Data

US 2024/0377549 A1 Nov. 14, 2024

(30) Foreign Application Priority Data

Dec. 30, 2021 (CN) ......................... 202111648685.7

(51) Int. Cl.
*G01V 1/40* (2006.01)
*G01H 9/00* (2006.01)
(Continued)

(52) U.S. Cl.
CPC ............. *G01V 1/306* (2013.01); *G01H 9/004* (2013.01); *G01V 1/226* (2013.01); *G01V 1/40* (2013.01);
(Continued)

(58) Field of Classification Search
CPC .......... G01V 1/306; G01V 1/226; G01V 1/40; G01V 2210/161; G01V 2210/59;
(Continued)

(56) References Cited

U.S. PATENT DOCUMENTS

2003/0086335 A1 5/2003 Naville et al.
2007/0280050 A1* 12/2007 Volterrani ................ G01V 1/28 367/73

(Continued)

FOREIGN PATENT DOCUMENTS

CN 1797037 A 7/2006
CN 109143364 A 1/2019

(Continued)

OTHER PUBLICATIONS

Extended European Search Report dated Jan. 29, 2025 in Application No. 22913241.0.

(Continued)

*Primary Examiner* — Krystine E Breier
(74) *Attorney, Agent, or Firm* — Sughrue Mion, PLLC

(57) ABSTRACT

A method for inverting a formation wave impedance using DAS borehole seismic data, including: acquiring an initial magnitude at a time window after the initial arrival time of seismic wavefield data in a well; mapping the initial magnitude to a relative wave impedance; and correcting the relative wave impedance to obtain an inverted wave impedance. Also provided are an apparatus for inverting a formation wave impedance using DAS borehole seismic data, a device, and a computer-readable storage medium.

13 Claims, 2 Drawing Sheets

(51) Int. Cl.
*G01V 1/22* (2006.01)
*G01V 1/30* (2006.01)

(52) U.S. Cl.
CPC ................ *G01V 2210/1299* (2013.01); *G01V 2210/161* (2013.01); *G01V 2210/59* (2013.01); *G01V 2210/6169* (2013.01); *G01V 2210/6226* (2013.01)

(58) Field of Classification Search
CPC ... G01V 2210/6169; G01V 2210/6226; G01V 2210/1299; G01H 9/004
See application file for complete search history.

(56) References Cited

U.S. PATENT DOCUMENTS

| | | | | |
|---|---|---|---|---|
| 2019/0049612 | A1 | 2/2019 | Padhi et al. | |
| 2021/0149070 | A1* | 5/2021 | Alfi | G01V 1/42 |

FOREIGN PATENT DOCUMENTS

| | | | | |
|---|---|---|---|---|
| CN | 111665568 A | 9/2020 | | |
| CN | 111694053 A | 9/2020 | | |
| CN | 112305616 A | 2/2021 | | |
| CN | 112346129 A | 2/2021 | | |
| CN | 112782767 A | 5/2021 | | |
| CN | 113090251 A | 7/2021 | | |
| CN | 113672853 A | 11/2021 | | |
| WO | WO-9607935 A1 | * | 3/1996 | G01V 1/306 |
| WO | 2016/135505 A1 | 9/2016 | | |

OTHER PUBLICATIONS

Bob A Hardage, Noise Problem encountered in VSP, “Vertical Seismic Profiling (Robum, Prospecting Principles Section)”, Geophysical Prospecting Institute, Department of Coal Industry, 1986 (21 pages total).

Office Action issued May 21, 2024 in Chinese Application No. 202111648685.7.

Haohao Zhang, “Vsp interpretation of carbonate reservoir of 327 well area in Tuofutai”, China University of Geosciences (Beijing), May 2020, 7 pages.

Chinese Search Report for CN Application 202111648685.7, dated Jan. 25, 2022.

International Search Report for PCT/CN2022/102511, dated Sep. 16, 2022.

* cited by examiner

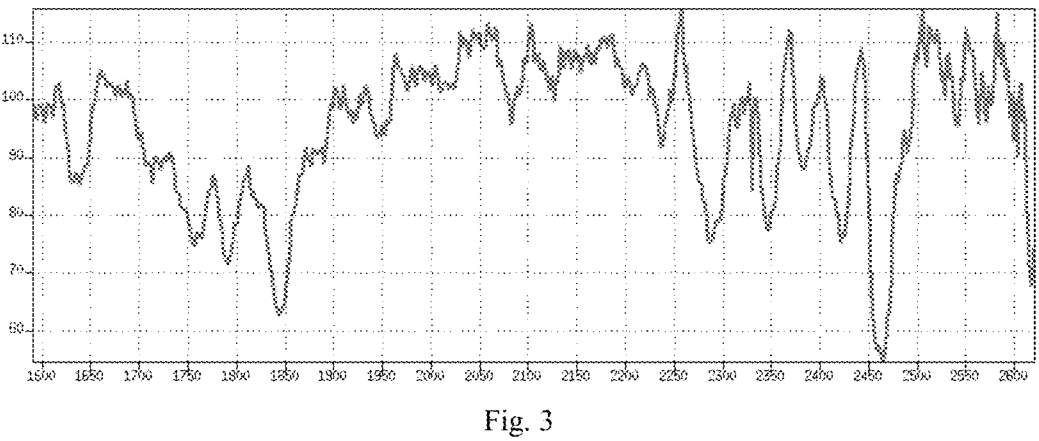
Fig. 3
Fig. 4
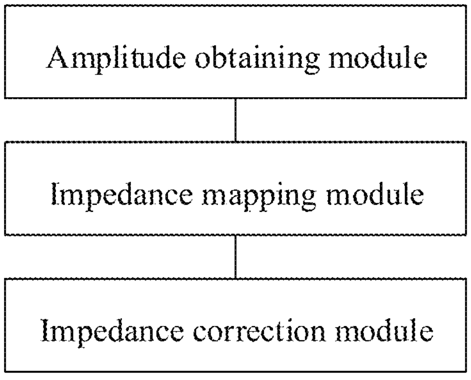
Fig. 5

METHOD AND APPARATUS FOR INVERTING FORMATION WAVE IMPEDANCE USING DAS BOREHOLE SEISMIC DATA

CROSS REFERENCE TO RELATED APPLICATIONS

This application is a National Stage of International Application No. PCT/CN2022/102511 filed Jun. 29, 2022, claiming priority based on Chinese Application No. 202111648685.7, filed on Dec. 30, 2021, entitled "A method and apparatus for inverting formation wave impedance using DAS borehole seismic data", which is specifically and entirely incorporated by reference.

FIELD OF THE INVENTION

The present disclosure relates to the technical field of fiber sensing and borehole seismic exploration, in particular to a method for inverting formation wave impedance using DAS borehole seismic data, an apparatus for inverting the formation wave impedance using the DAS borehole seismic data, a device for inverting the formation wave impedance using the DAS borehole seismic data and a corresponding storage medium.

BACKGROUND OF THE INVENTION

An optical fiber distributed acoustic sensing (DAS) technology is becoming more and more widely used in vertical seismic profiling (VSP) exploration. Compared with conventional geophone acquisition, has remarkable advantages such as high-density sampling, high temperature and pressure resistance, full well section acquisition and good wavelet consistency. The DAS technology mainly uses Rayleigh backscattering (RBS) generated when a laser pulse propagates in an optical fiber. When a formation around the optical fiber vibrates, RBS will carry information of formation vibration changes. Through continuous observation of the DAS of the well optical fiber and phase demodulation of an optical signal, information of direct and reflected waves of seismic waves of the formation may be obtained.

The DAS technology is relatively suitable for observing seismic waves in wells, when the optical fibers are perpetually laid outside a casing, due to being directly coupled with the formation, abundant formation information may be obtained. How to effectively use high-density information of optical fiber DAS data to invert formation parameters is a difficult problem in seismic exploration. Research shows that at present, formation velocity, a Q value and the like are obtained generally based on a first arrival time of a direct wave. There is no method for directly inverting wave impedance using high-density DAS data direct wave. There are still many shortcomings in practical applications of existing methods. How to effectively use the high-density advantage of seismic data acquired by the optical fiber in wells to invert high-precision formation wave impedance is an urgent need.

SUMMARY OF THE INVENTION

Embodiments of the present disclosure aim to provide a method and device for inverting formation wave impedance using DAS borehole seismic data. By using the high-density characteristics of DAS seismic data, performing a high-precision picking of first arrivals, and inverting the formation wave impedance using first arrival amplitude information. An objective is to invert high-precision formation wave impedance through the borehole seismic data acquired by the optical fiber DAS. Then, the description capability of reservoir parameters is improved, and an application effect of seismic exploration is improved. An implementation provided by the method is also suitable for a formation wave impedance inversion process of the borehole seismic data acquired by other ways.

In order to implement the above objective, in a first aspect, the present disclosure provides a method for inverting formation wave impedance using DAS borehole seismic data. The method includes: obtaining a first arrival amplitude under a time window after a first arrival time of borehole seismic wavefield data; mapping the first arrival amplitude to relative wave impedance; and correcting the relative wave impedance to obtain inverted wave impedance.

Preferably, the method further includes: for the borehole seismic wavefield data acquired for multiple times or the borehole seismic wavefield data acquired for different time window lengths of the same borehole seismic wavefield data, repeating the following steps for multiple times to correspondingly obtain a plurality of inverted wave impedance:

- obtaining a first arrival amplitude under a time window after a first arrival time of borehole seismic wavefield data;
- mapping the obtained first arrival amplitude to corresponding relative wave impedance;
- correcting the relative wave impedance to obtain corresponding inverted wave impedance; and
- statistically calculating the plurality of obtained inverted wave impedance to obtain final inverted wave impedance.

Preferably, obtaining the first arrival amplitude under the time window after the first arrival time includes: obtaining borehole seismic wavefield data excited by a seismic source; processing the borehole seismic wavefield data, and determining the first arrival time by adopting a first arrival picking method; and extracting the first arrival amplitude $A_i$ by taking the time window downward from the first arrival time, and i is a corresponding trace number.

Preferably, obtaining the borehole seismic wavefield data excited by the seismic source includes: laying optical fibers outside a well casing for reception using an optical fiber DAS acquisition instrument, exciting on the surface or in a well using an explosive seismic source or a vibroseis, and acquiring the borehole seismic wavefield data.

Preferably, the method further includes: performing spherical diffusion compensation on the first arrival amplitude before mapping the first arrival amplitude to the relative wave impedance.

Preferably, correcting the relative wave impedance to obtain the inverted wave impedance includes: $I_{DAS}=a\times I_r+b$, where $I_{DAS}$ is the inverted wave impedance, $I_r$ is the relative wave impedance, and a and b are preset correction coefficients.

Preferably, the correction coefficients a and b are determined through the following steps: calculating wave impedance of a corresponding well section through existing well-logging data; making a crossplot of the wave impedance with the calculated relative wave impedance; and obtaining the correction coefficients a and b through linear fitting.

In a second aspect, the present disclosure further provides an apparatus for inverting formation wave impedance using DAS borehole seismic data. The apparatus includes: an amplitude obtaining module, configured to obtain a first arrival amplitude under a time window after a first arrival time of borehole seismic wavefield data; an impedance mapping module, configured to map the first arrival amplitude to a relative wave impedance; and an impedance correction module, configured to correct the relative wave impedance to obtain inverted wave impedance.

Preferably, the apparatus is further configured to: for the borehole seismic wavefield data acquired for multiple times or the borehole seismic wavefield data acquired for different time window lengths of the same borehole seismic wavefield data, repeat the following steps for multiple times to correspondingly obtain a plurality of inverted wave impedance:

obtaining a first arrival amplitude under a time window after a first arrival time of borehole seismic wavefield data;

mapping the obtained first arrival amplitude to corresponding relative wave impedance;

correcting the relative wave impedance to obtain corresponding inverted wave impedance; and statistically calculating the plurality of obtained inverted wave impedance to obtain final inverted wave impedance.

Preferably, obtaining the first arrival amplitude under the time window after the first arrival time includes: obtaining borehole seismic wavefield data excited by a seismic source; processing the borehole seismic wavefield data, and determining the first arrival time by adopting a first arrival picking method; and extracting the first arrival amplitude $A_i$ by taking the time window downward from the first arrival time, and i is a corresponding trace number.

Preferably, before determining the first arrival time by adopting the first arrival picking method, the apparatus is further configured to: eliminate upgoing waves in the borehole seismic wavefield data by adopting a multichannel velocity filtering algorithm.

Preferably, after obtaining the first arrival amplitude under the time window after the first arrival time through statistical calculating, the apparatus is further configured to: perform spherical diffusion compensation on the first arrival amplitude.

Preferably, correcting the relative wave impedance to obtain the inverted wave impedance includes: $I_{DAS}=a\times I_r+b$, where $I_{DAS}$ is the inverted wave impedance, $I_r$ is the relative wave impedance, and a and b are preset correction coefficients.

Preferably, the correction coefficients a and b are determined through the following steps: calculating wave impedance of a corresponding well section through existing well-logging data; making a crossplot of the wave impedance with the calculated relative wave impedance; and obtaining the correction coefficients a and b through linear fitting.

In a third aspect, the present disclosure provides a device for inverting formation wave impedance using DAS borehole seismic data. The device includes a memory, a processor and a computer program stored in the memory and capable of operating on the processor, and the processor, when executing the computer program, implements the before-mentioned method for inverting the formation wave impedance using DAS borehole seismic data.

In a fourth aspect, the present disclosure provides a computer readable storage medium, the storage medium stores an instruction, and the instruction, when running on a computer, causes the computer to execute the before-mentioned method for inverting the formation wave impedance using DAS borehole seismic data.

In a fifth aspect, the present disclosure provides a computer program product, including a computer program, and the computer program, when executed by a processor, implements the before-mentioned method for inverting the formation wave impedance using DAS borehole seismic data.

The above technical solution has the following beneficial effects:

The implementation of the present disclosure is a method for performing a first arrival picking on the seismic data acquired by high-density optical fiber DAS, statistically calculating the first arrival time window and amplitude and obtaining formation wave impedance information through inversion, can effectively overcome the uncertainty of solution of inverting the wave impedance by using a seismic profile and remarkably improve the precision of the wave impedance, and a resolution may reach a level of meters or even higher, which provides a guarantee for subsequent reservoir interpretation.

Other features and advantages of the embodiments of the present disclosure will be described in detail in the following parts of specific implementations.

BRIEF DESCRIPTION OF DRAWINGS

Accompanying drawings are used for providing a further understanding of embodiments of the present disclosure, constitute a part of the specification, and together with the following specific implementations, are used for explaining the embodiments of the present disclosure, but not constitute a limitation on the embodiments of the present disclosure. In the accompanying drawings:

FIG. 3 schematically shows a schematic diagram of inverted wave impedance of a first arrival amplitude according to an embodiment of the application.

FIG. 4 schematically shows a schematic diagram of wave impedance obtained through well-logging according to an embodiment of the application.

FIG. 5 schematically shows a schematic structural diagram of an apparatus for inverting formation wave impedance using DAS borehole seismic data according to an embodiment of the application.

DETAILED DESCRIPTION OF THE EMBODIMENTS

Specific implementations of embodiments of the present disclosure are described in detail in combination with the accompanying drawings below. It should be understood that the specific implementations described herein are only used to illustrate and explain the embodiments of the present disclosure, are not used to limit the embodiments of the present disclosure.

Obtaining, storage, use and processing of data in technical solution of the present disclosure comply with relevant provisions of national laws and regulations.

Figure 1:
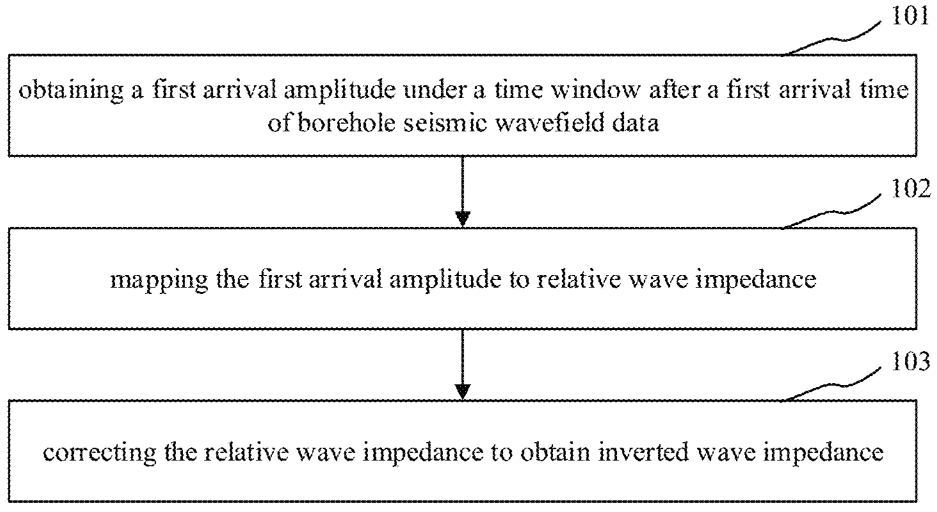
FIG. 1 schematically shows a schematic diagram of steps of a method for inverting formation wave impedance using DAS borehole seismic data according to an embodiment of the application.

FIG. 1 schematically shows a schematic diagram of steps of a method for inverting formation wave impedance using DAS borehole seismic data according to an embodiment of the application. As shown in FIG. 1, in an embodiment of the present disclosure, a method for inverting formation wave impedance using DAS borehole seismic data is provided and includes:

101, obtaining a first arrival amplitude under a time window after a first arrival time of borehole seismic wavefield data;

102, mapping the first arrival amplitude to relative wave impedance; and

103, correcting the relative wave impedance to obtain inverted wave impedance.

In the implementation, picking of the first arrival time may adopt a plurality of computer algorithms for picking the first arrival time in the prior art. The first arrival amplitude is extracted by taking a short time window after the first arrival time, and the first arrival amplitude may be a root mean square amplitude or an average amplitude. According to an inversely proportional relationship (the greater the impedance is, the smaller the amplitude is) between the amplitude and the impedance, the first arrival amplitude is mapped to the relative wave impedance through a reciprocal method. However, the relative wave impedance obtained at the moment lacks a direct relevance with real wave impedance of a corresponding well section, a specific true magnitude and range of the wave impedance of the corresponding well section cannot be embodied, so there is a larger error, which needs to be corrected. The implementation corrects the relative wave impedance according to a correction model to obtain inverted wave impedance, so as to improve a measuring precision of the inverted wave impedance.

Through the above mode, the uncertainty of solution of inverting the wave impedance by using a seismic profile may be effectively overcome, the precision of the wave impedance is remarkably improved, and a resolution may reach a level of meters or even higher, which provides a guarantee for subsequent reservoir interpretation.

In some implementations provided by the present disclosure, the method further includes: for the borehole seismic wavefield data acquired for multiple times or the borehole seismic wavefield data acquired for different time window lengths of the same borehole seismic wavefield data, repeating the following steps for multiple times to correspondingly obtain a plurality of inverted wave impedance:

obtaining a first arrival amplitude under a time window after a first arrival time of borehole seismic wavefield data;

mapping the obtained first arrival amplitude to corresponding relative wave impedance;

correcting the relative wave impedance to obtain corresponding inverted wave impedance; and statistically calculating the plurality of obtained inverted wave impedance to obtain final inverted wave impedance.

For each repeated process, according to the different borehole seismic wavefield data, a first arrival time of the borehole seismic wavefield data need to be renewedly obtained and subsequent processing steps are executed. The different borehole seismic wavefield data herein include but are not limited to borehole seismic wavefield data acquired for multiple times or borehole seismic wavefield data acquired for different time window lengths of the same borehole seismic wavefield data. Each method execution will obtain inverted wave impedance, and the plurality of inverted wave impedance obtained through the multiple executions are statistically calculated to obtain final inverted wave impedance. The statistical calculating method herein includes an arithmetic mean method, a weighted mean method or a median method, etc. Through the implementation, random errors brought by a single inverted wave impedance test may be avoided.

Figure 2:
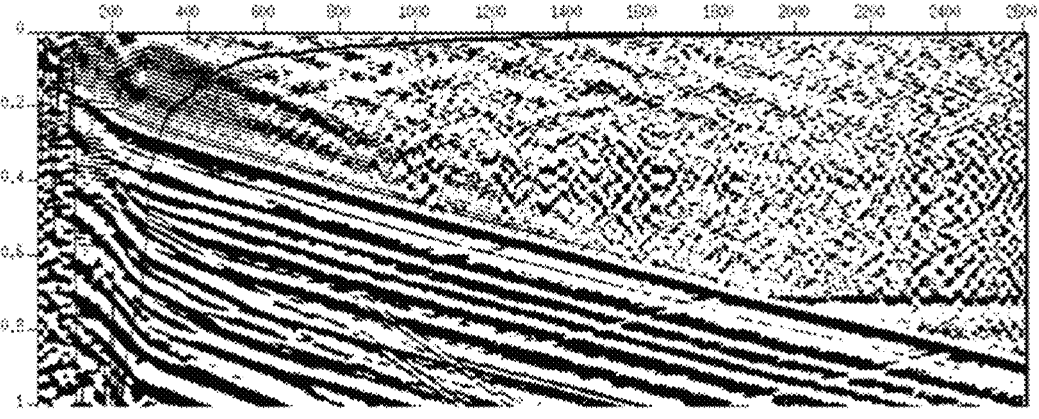
FIG. 2 schematically shows a schematic diagram of zero-offset DAS-VSP recording according to an embodiment of the application.

In some implementations provided by the present disclosure, obtaining the first arrival amplitude under the time window after the first arrival time includes: obtaining borehole seismic wavefield data excited by a seismic source, for example, optical fibers are laid outside a well casing for reception using an optical fiber DAS acquisition instrument, exciting is performed on the surface or in a well using an explosive seismic source or a vibroseis; and the borehole seismic wavefield data are acquired. Selected parameters may be that the optical fibers are laid outside the well casing for 2620 meters for reception, exciting points are selected 60 meters near a wellhead, etc. The acquired borehole seismic wavefield data are shown in FIG. 2. FIG. 2 schematically shows a schematic diagram of zero-offset DAS-VSP recording according to an embodiment of the application.

Further, the acquired borehole seismic wavefield data are processed, and the first arrival time is determined by adopting a first arrival picking method. The first arrival picking method of the present implementation includes a maximum energy method, a Short Term Average/Long Term Average (STA/LTA) method, a cross-correlation method, a phase tracking method, etc. Those skilled in the art may alternatively select one according to an actual scene or adopt a combination of multiple methods.

The first arrival amplitude $A_i$ is extracted by taking the time window downward from the first arrival time, i is the corresponding trace number, which is a natural number valued as 1, 2, . . . . First arrival amplitudes of all observation points may be obtained through the above implementation.

In order to obtain a more accurate first arrival time, the present implementation preprocesses the acquired borehole seismic wavefield data before determining the first arrival time by adopting the first arrival picking method. The present implementation adopts the multichannel velocity filtering algorithm to eliminate upgoing waves in the seismic waves. The filtering algorithm herein includes: a median filtering method or an average filtering method.

In order to obtain a more accurate first arrival amplitude, the present implementation performs preprocessing before mapping the first arrival amplitude to the relative wave impedance. The present implementation performs spherical diffusion compensation on the statistically calculated first arrival amplitude $A_i$, so as to eliminate an amplitude changing influence caused by spherical diffusion. The reasonable spherical diffusion compensation is one of important factors in relative amplitude preserving processing. Spherical diffusion compensation of the first arrival amplitude may be implemented by setting spherical diffusion compensation factors of a reflected wave at any given offset horizontal interface in a continuous medium where the wave velocity increases linearly with a depth.

In some implementations provided by the present disclosure, correcting the relative wave impedance to obtain the inverted wave impedance includes: $I_{DAS}=a\times I_r+b$, where $I_{DAS}$ is the inverted wave impedance, $I_r$ is the relative wave impedance, and correction coefficients a and b are preset parameters. The present implementation provides a first-order linear compensation mode. That is, the relative wave impedance is corrected through a first-order linear function, so as to obtain the inverted wave impedance. The obtained inverted wave impedance is shown in FIG. 3, and FIG. 3 schematically shows a schematic diagram of inverted wave impedance of a first arrival amplitude according to an embodiment of the present disclosure. By setting the reasonable correction coefficients a and b, the obtained inverted wave impedance may reflect an actual geological condition more accurately, and the precision of the wave impedance is improved.

In some implementations provided by the present disclosure, the correction coefficients a and b are determined through the following steps: calculating the wave impedance of a corresponding well section through existing well-logging data, and the obtained data are shown in FIG. 4. FIG. 4 schematically shows a schematic diagram of wave impedance obtained through well-logging according to an embodiment of the application. A crossplot is made for the wave impedance and the calculated relative wave impedance. A crossplot method refers to a plotting interpretation technology for analyzing a multiparameter correlation. Two kinds of data are intersected on a plane graph, and a linear relation of two and a corresponding parameter value may be obtained through two-parameter linear fitting of the crossplot. In the present implementation, the correction coefficients a and b are obtained through the linear fitting between the wave impedance obtained through well-logging and the calculated relative wave impedance. Actual values of the correction coefficients a and b may be obtained by adopting a linear regression mode herein. Representations of the correction coefficients a and b on a coordinate system are that a is a slope of linear correction, and b is an intercept of linear correction.

In some optional implementations provided by the present disclosure, the method for inverting the formation wave impedance using the DAS borehole seismic data includes the following steps:

(1) The optical fiber DAS acquisition instrument is used, optical fibers are laid outside the well casing for 2620 meters for reception, exciting points are selected 60 meters near a wellhead, exciting is performed on the surface or in a well using a vibroseis; and the borehole seismic wavefield data are acquired.

(2) High-precision first arrival time information is obtained from the acquired data obtained in step (1) using a first arrival picking method, such as a maximum energy method.

(3) Upgoing waves are eliminated using a median filtering method or an average filtering method, and an interference effect of the upgoing waves is eliminated.

(4) The first arrival amplitude $A_i$ is extracted by taking the short time window downward from the first arrival time, and i is the corresponding trace number. A length of the time window herein is 30 ms, and the amplitude is a root mean square amplitude.

(5) Spherical diffusion compensation is performed on the statistically calculated amplitude $A_i$, and the amplitude changing influence caused by spherical diffusion is eliminated. The relative wave impedance $I_r$ is obtained through reciprocal calculating.

(6) The wave impedance Imp of the corresponding well section is calculated through the existing well-logging data, which makes a crossplot with the calculated relative wave impedance $I_r$, and the correction coefficients a and b are obtained through fitting. Herein a is a slope of linear correction, and b is an intercept of linear correction.

(7) Linear correction is performed on the statistically calculated first arrival amplitude $A_i$ to obtain inverted wave impedance $I_{DAS}$. A correction formula is as follows: $I_{DAS}=a \times I_r+b$.

(8) In order to improve the accuracy of an inversion result, the above steps may be repeated, and arithmetic mean or mid-value taking is performed on the inverted wave impedance $I_{DAS}$ obtained every time to serve as final inverted wave impedance.

Through the above implementation, the uncertainty of solution of inverting the wave impedance by using the seismic profile may be effectively overcome, the precision and a resolution of the wave impedance are remarkably improved, and a guarantee is provided for subsequent reservoir interpretation.

Based on the same inventive concept, an implementation of the present disclosure further provides an apparatus for inverting formation wave impedance using DAS borehole seismic data. FIG. 5 schematically shows a schematic diagram of implementation steps of an apparatus for inverting formation wave impedance using DAS borehole seismic data according to an embodiment of the present disclosure. As shown in FIG. 5, the apparatus includes: an amplitude obtaining module, configured to obtain a first arrival amplitude under a time window after a first arrival time of borehole seismic wavefield data; an impedance mapping module, configured to map the first arrival amplitude to a relative wave impedance; and an impedance correction module, configured to correct the relative wave impedance to obtain inverted wave impedance.

In some optional implementations, the apparatus is further configured to: for the borehole seismic wavefield data acquired for multiple times or the borehole seismic wavefield data acquired for different time window lengths of the same borehole seismic wavefield data, repeat the following steps for multiple times to correspondingly obtain a plurality of inverted wave impedance:

obtaining a first arrival amplitude under a time window after a first arrival time of borehole seismic wavefield data;

mapping the obtained first arrival amplitude to corresponding relative wave impedance;

correcting the relative wave impedance to obtain corresponding inverted wave impedance; and statistically calculating the plurality of obtained inverted wave impedance to obtain final inverted wave impedance.

In some optional implementations, obtaining the first arrival amplitude under the time window after the first arrival time includes: borehole seismic wavefield data excited by a seismic source are obtained; the first arrival time is determined by adopting a first arrival picking method; and the first arrival amplitude is extracted by taking the time window downward from the first arrival time.

In some optional implementations, before determining the first arrival time by adopting the first arrival picking method, the apparatus is further configured to: eliminate upgoing waves in the borehole seismic wavefield data by adopting a multichannel velocity filtering algorithm.

In some optional implementations, the apparatus is further configured to: before mapping the first arrival amplitude to the relative wave impedance, perform spherical diffusion compensation on the first arrival amplitude.

In some optional implementations, correcting the relative wave impedance to obtain the inverted wave impedance includes: $I_{DAS}=a \times I_r+b$, where $I_{DAS}$ is the inverted wave impedance, $I_r$ is the relative wave impedance, and correction coefficients a and b are preset parameters.

In some optional implementations, the correction coefficients a and b are determined through the following steps: calculating the wave impedance of a corresponding well section through existing well-logging data, and making a crossplot for the wave impedance and the calculated relative wave impedance; and obtaining the correction coefficients a and b through linear fitting.

Those skilled in the art can understand that the structure shown in FIG. 5 is only a block diagram of a part of structure related with the solution of the application, does not constitute a limitation on a computer device to which the solution of the application is applied, the specific computer device may include more or fewer components than that in the figure, or combine some components, or have different component arrangements.

The above specific limitation of the implementation steps in the apparatus for inverting the formation wave impedance using the DAS borehole seismic data may refer to the limitation of the above method for inverting the formation wave impedance using the DAS borehole seismic data, which is not repeated here. The beneficial effect may perform applicability presumption according to the beforementioned method for inverting the formation wave impedance using the DAS borehole seismic data.

An embodiment of the present disclosure provides a device, the device includes a processor, a memory and a program stored on the memory and capable of operating on the processor, and the processor, when executing the program, implements the steps of the method for inverting the formation wave impedance using the DAS borehole seismic data.

The present disclosure further provides a computer program product. The computer program product, when executed on a data processing device, is suitable for executing a program initially including the steps of the method for inverting the formation wave impedance using the DAS borehole seismic data.

Those skilled in the art should understand that the embodiments of the application may be provided as a method, a system, or a computer program product. Therefore, the application may adopt forms of a complete hardware embodiment, a complete software embodiment, or an embodiment combining with software and hardware aspects. Moreover, the application may adopt a form of a computer program product implemented on one or more computer available storage media (including but not limited to a disk memory, a CD-ROM, an optical memory, etc.) in which a computer available program code is contained.

The application is described by referring to a flow diagram and/or a block diagram of a method, device (system), and a computer program product according to embodiments of the present disclosure. It should be understood that a computer program instruction may implement each flow and/or block in the flow diagram and/or the block diagram and a combination of flows and/or blocks in the flow diagram and/or the block diagram. These computer program instructions may be provided to a processor of a general-purpose computer, a dedicated computer, an embedded processor or another programmable data processing device to generate a machine, so that instructions executed through the processor of the computer or another programmable data processing device produces an apparatus used for implementing an assigned function in one flow or a plurality of flows in the flow diagram and/or one block or a plurality of blocks in the block diagram.

These computer program instructions may also be stored in a computer readable memory capable of guiding the computer or another programmable data processing device to work in a specific way, so that the instructions stored in the computer readable memory produce a manufacture including an instruction apparatus, and the instruction apparatus implements assigned functions in one flow or a plurality of flows in the flow diagram and/or one block or a plurality of blocks in the flock diagram.

These computer program instructions may also be loaded on a computer or another programmable data processing device, so that a series of operation steps are executed on the computer or another programmable device to generate processing implemented by the computer, and therefore, steps for implementing assigned functions in one flow or a plurality of flows in the flow diagram and/or one block or a plurality of blocks in the block diagram are provided by the instructions executed on the computer or another programmable device.

In a typical configuration, a computer device includes one or more central processing units (CPU), an input/output interface, a network interface and an internal memory.

The memory may include forms of a volatile memory, a random access memory (RAM) and/or a non-volatile internal memory in a computer readable medium, such as a read-only memory (ROM) or a flash RAM. The memory is an example of the computer readable medium.

The computer readable medium includes non-volatile, volatile, mobile and non-mobile media, and may implement information storage in any method or technology. Information may be a computer readable instruction, a data structure, a module of a program or other data. Examples of the computer storage medium include, but are not limited to a phase change random access memory (PRAM), a static random access memory (SRAM), a dynamic random access memory (DRAM), random access memories (RAMs) of other types, a read-only memory (ROM), an electrically erasable programmable read-only memory (EEPROM), a flash memory or other internal memory 20) technologies, a compact disc read-only memory (CD-ROM), a digital versatile disc (DVD) or other optical memories, cassette tapes, tape disk memories or other magnetic-memory devices or any other non-transmission media, which may be used for storing information that can be accessed by the computer devices. According to the definition herein, the computer readable medium does not include transitory media, such as modulated data signals and carriers.

It needs to be further explained that terms "include". "contain" or any other variants thereof are intended to cover non-exclusive containing, so that a process, a method, a commodity or a device including a series of elements not only includes those elements, but also includes other elements which are not listed clearly, or further includes intrinsic elements for the process, the method, the commodity or the device. Without more limitations, elements limited by a statement "including one . . . " do not exclude existence of the same other elements in the process, the method, the commodity or the device including the elements.

The above are only embodiments of the application and are not intended to limit the application. For those skilled in the art, various changes and transformations may be made to the application. Any modifications, equivalent replacements, improvements or the like made within the spirit and principle of the application should fall within the scope of the claims of the application.

The invention claimed is:

1. A method for inverting formation wave impedance using DAS borehole seismic data, comprising:

obtaining a first arrival amplitude of borehole seismic wavefield data, wherein the first arrival amplitude comprises a root mean square amplitude or an average amplitude of the borehole seismic wavefield data within a time window after a first arrival time, wherein the borehole seismic wavefield data are obtained by using an optical fiber DAS acquisition instrument;

mapping the first arrival amplitude to relative wave impedance; and correcting the relative wave impedance by the following formula to obtain inverted wave impedance:

$$I_{DAS}=a\times I_r+b,$$

wherein, $I_{DAS}$ is the inverted wave impedance, $I_r$ is the relative wave impedance, and a and b are correction coefficients; and wherein, the correction coefficients a and b are determined through the following steps:

calculating wave impedance of a corresponding well section through existing well-logging data;

making a crossplot of the wave impedance with the calculated relative wave impedance; and obtaining the correction coefficients a and b through linear fitting.

2. The method according to claim 1, further comprising: for the borehole seismic wavefield data acquired for multiple times or the borehole seismic wavefield data acquired for different time window lengths of the same borehole seismic wavefield data, repeating the method for multiple times to correspondingly obtain a plurality of inverted wave impedances; and statistically calculating the inverted wave impedance based on the plurality of obtained inverted wave impedances.

3. The method according to claim 1, wherein obtaining the first arrival amplitude of the borehole seismic wavefield data comprises:

obtaining borehole seismic wavefield data excited by a seismic source;

processing the borehole seismic wavefield data, and determining the first arrival time by adopting a first arrival picking method; and extracting the first arrival amplitude by taking the time window downward from the first arrival time.

4. The method according to claim 3, wherein obtaining the borehole seismic wavefield data excited by the seismic source comprises: laying optical fibers outside a well casing for reception by using an optical fiber DAS acquisition instrument, exciting on the surface or in a well by using an explosive seismic source or a vibroseis, and acquiring the borehole seismic wavefield data.

5. The method according to claim 3, further comprising: performing spherical diffusion compensation on the first arrival amplitude before mapping the first arrival amplitude to the relative wave impedance.

6. A device for inverting formation wave impedance using DAS borehole seismic data, comprising a memory, a processor and a computer program stored in the memory and capable of operating on the processor, wherein the processor, when executing the computer program, implements the following steps:

obtaining a first arrival amplitude of borehole seismic wavefield data, wherein the first arrival amplitude comprises a root mean square amplitude or an average amplitude of the borehole seismic wavefield data within a time window after a first arrival time of borehole seismic wavefield data, wherein the borehole seismic wavefield data are obtained by using an optical fiber DAS acquisition instrument;

mapping the first arrival amplitude to relative wave impedance; and correcting the relative wave impedance by the following formula to obtain inverted wave impedance:

$$I_{DAS}=a\times I_r+b,$$

wherein, $I_{DAS}$ is the inverted wave impedance, $I_r$ is the relative wave impedance, and a and b are correction coefficients; and wherein, the correction coefficients a and b are determined through the following steps:

calculating wave impedance of a corresponding well section through existing well-logging data;

making a crossplot of the wave impedance with the calculated relative wave impedance; and obtaining the correction coefficients a and b through linear fitting.

7. The device according to claim 6, for the borehole seismic wavefield data acquired for multiple times or the borehole seismic wavefield data acquired for different time window lengths of the same borehole seismic wavefield data, repeating the steps for multiple times to correspondingly obtain a plurality of inverted wave impedance; and statistically calculating the inverted wave impedance based on the plurality of obtained inverted wave impedances.

8. The device according to claim 6, wherein obtaining the first arrival amplitude of the borehole seismic wavefield data comprises:

obtaining borehole seismic wavefield data excited by a seismic source;

processing the borehole seismic wavefield data, and determining the first arrival time by adopting a first arrival picking method; and extracting the first arrival amplitude by taking the time window downward from the first arrival time.

9. The device according to claim 7, wherein obtaining the borehole seismic wavefield data excited by the seismic source comprises: distributing optical fibers outside a well casing for reception by using an optical fiber DAS acquisition instrument, exciting on the surface or in a well by using an explosive seismic source or a vibroseis, and acquiring the borehole seismic wavefield data.

10. The device according to claim 7, further comprising: performing spherical diffusion compensation on the first arrival amplitude before mapping the first arrival amplitude to the relative wave impedance.

11. A non-transitory computer readable storage medium, wherein the storage medium stores an instruction, and the instruction, when running on a computer, cause the computer to execute the following steps:

obtaining a first arrival amplitude of borehole seismic wavefield data, wherein the first arrival amplitude comprises a root mean square amplitude or an average amplitude of the borehole seismic wavefield data within a time window after a first arrival time of borehole seismic wavefield data, wherein the borehole seismic wavefield data are obtained by using an optical fiber DAS acquisition instrument;

mapping the first arrival amplitude to relative wave impedance; and correcting the relative wave impedance by the following formula to obtain inverted wave impedance:

$$I_{DAS}=a\times I_r+b,$$

wherein, $I_{DAS}$ is the inverted wave impedance, $I_r$ is the relative wave impedance, and a and b are correction coefficients; and wherein, the correction coefficients a and b are determined through the following steps:

calculating wave impedance of a corresponding well section through existing well-logging data;

making a crossplot of the wave impedance with the calculated relative wave impedance; and obtaining the correction coefficients a and b through linear fitting.

12. The non-transitory computer readable storage medium according to claim 11, for the borehole seismic wavefield data acquired for multiple times or the borehole seismic wavefield data acquired for different time window lengths of the same borehole seismic wavefield data, repeating the steps for multiple times to correspondingly obtain a plurality of inverted wave impedance; and statistically calculating the inverted wave impedance based on the plurality of obtained inverted wave impedances.

13. The non-transitory computer readable storage medium according to claim 11, wherein obtaining the first arrival amplitude of the borehole seismic wavefield data comprises:

obtaining borehole seismic wavefield data excited by a seismic source;

processing the borehole seismic wavefield data, and determining the first arrival time by adopting a first arrival picking method; and extracting the first arrival amplitude by taking the time window downward from the first arrival time.

* * * * *